(12) United States Patent
Ono et al.

(10) Patent No.: US 7,262,788 B2
(45) Date of Patent: Aug. 28, 2007

(54) CONFERENCE SUPPORT SYSTEM, INFORMATION DISPLAYING APPARATUS, MACHINE READABLE MEDIUM STORING THEREON A PLURALITY OF MACHINE READABLE INSTRUCTIONS, AND CONTROL METHOD

(75) Inventors: Shuji Ono, Kanagawa (JP); Shuichi Ohtsuka, Kanagawa (JP); Wataru Ito, Kanagawa (JP); Ayumu Isomura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/949,219

(22) Filed: Sep. 27, 2004

(65) Prior Publication Data

US 2005/0093971 A1   May 5, 2005

(30) Foreign Application Priority Data

Sep. 25, 2003   (JP) ............................ 2003-334273
Sep. 2, 2004    (JP) ............................ 2004-255492

(51) Int. Cl.
  *H04N 7/14*   (2006.01)
(52) U.S. Cl. .............................. 348/14.09; 348/14.08; 370/260
(58) Field of Classification Search .. 348/14.01–14.09, 348/14.1, 14.12, 14.13; 370/260, 261; 715/753; 709/204
See application file for complete search history.

(56) References Cited

U.S. PATENT DOCUMENTS

| | | | |
|---|---|---|---|
| 6,606,111 B1 * | 8/2003 | Kondo et al. | 348/14.01 |
| 6,816,904 B1 * | 11/2004 | Ludwig et al. | 709/226 |
| 6,894,714 B2 * | 5/2005 | Gutta et al. | 348/14.07 |
| 2005/0007445 A1 * | 1/2005 | Foote et al. | 348/14.08 |

FOREIGN PATENT DOCUMENTS

GB    2351628 A  * 1/2001
JP    410275144 A * 10/1998

OTHER PUBLICATIONS

Hendricsks et al. ; Video Conferencing using an electronic book viewer; Mar. 15, 2001; WO01/18665.*

* cited by examiner

*Primary Examiner*—Melur Ramakrishnaiah
(74) *Attorney, Agent, or Firm*—Sughrue Mion, PLLC

(57) ABSTRACT

According to the present invention, the progress of the proceedings is supported by making the contents of the conference understand easily to the attendant of the conference. A conference support system for supporting progress of proceedings, including: speaker's gaze direction detection means for detecting a gaze direction of a speaker of a conference; image receiving means for receiving an image in which object gazed by the speaker in speaker's gaze direction is photographed; and displaying means for displaying the image received by the image receiving means on a display provided for each attendant of the conference.

14 Claims, 6 Drawing Sheets

290

| TIME | SPEAKER'S IMAGE | REFERENCE PART INFORMATION | AGREEMENT STATUS |
|---|---|---|---|
| 3:10PM <br> \| <br> 3:30PM | MR. ××  | LINES 3-5, PAGE 10 OF "MATERIAL FOR AGENDA A" .... ............. | AGREED |
| \| <br> 3:45PM | MS. □□  | ............. ............. ............. ............. | AGREED |
| \| <br> 4:00PM | MR. ○○  | ............. ............. ............. ............. | DISAGREED |
| ⋮ | ⋮ | ⋮ | ⋮ |

CONFERENCE SUPPORT SYSTEM, INFORMATION DISPLAYING APPARATUS, MACHINE READABLE MEDIUM STORING THEREON A PLURALITY OF MACHINE READABLE INSTRUCTIONS, AND CONTROL METHOD

This patent application claims priority from Japanese patent applications Nos. 2003-334273 filed on Sep. 25, 2003 and 2004-255492 filed on Sep. 2, 2004, the contents of which are incorporated herein by reference.

BACKGROUND OF THE INVENTION

1. Field of the Invention

The present invention relates to a conference support system, an information displaying apparatus, a machine readable medium storing thereon a plurality of machine readable instructions, and a control method. More particularly, the present invention relates to a conference support system, an information displaying apparatus, a machine readable medium storing thereon a plurality of machine readable instructions, and a control method for supporting progress of the proceedings based on images of condition of the conference.

2. Description of the Related Art

In recent years, a presentation using a projector to display a material on a screen to make attendants understand the presentation easily.

However, since a presenter and the material have to be set before the conference, the above-mentioned method is not suitable for the conference at which a plurality of speakers discuss with one another. Even in this case, when the contents of the discussion are displayable, the attendants can understand the statement of the speakers more easily and it will be convenience for all attendants.

SUMMARY OF THE INVENTION

Therefore, it is an object of the present invention to provide a conference support system, an information displaying apparatus, a machine readable medium storing thereon a plurality of machine readable instructions, and a control method, which are capable of overcoming the above drawbacks accompanying the conventional art. The above and other objects can be achieved by combinations described in the independent claims. The dependent claims define further advantageous and exemplary combinations of the present invention.

To solve the foregoing problem, according to a first aspect of the present invention, there is provided a conference support system for supporting progress of proceedings. The conference support system includes: speaker's gaze direction detection means for detecting a gaze direction of a speaker of a conference; image receiving means for receiving an image in which object gazed by the speaker in speaker's gaze direction is photographed; and displaying means for displaying the image received by the image receiving means on a display provided for each attendant of the conference. Moreover, the conference support system may further include minutes-of-proceedings generating means for associating object identification information identifying the object gazed by the speaker in the speaker's gaze direction with information indicating progress-of-proceedings and for recording them.

Moreover, the conference support system may further include gazed object detection means for detecting material identification information indicating material gazed by the speaker in the speaker's gaze direction, and material reference part information indicating a part gazed by the speaker among the material by analyzing the photographed image of the object gazed by the speaker in the speaker's gaze direction, and the displaying means may display the material identification information and the material reference part information detected by the gazed object detection means. Moreover, the conference support system may further include statement receiving means for receiving a speaker's statement, wherein the gazed object detection means may detect a part gazed by the speaker among the material by searching text data in the material using words included in the statement. Moreover, the conference support system may further include: attendant's gaze direction detection means for detecting a gaze direction of at least one of attendants attending the conference; and speaker detection means for detecting a speaker out of the attendants of the conference based on the gaze direction of at least one of the attendants.

Moreover, the conference support system may further include: agreement judgment means for judging whether an attendant agrees with the speaker's statement when analyzing the facial expression of the attendant who is gazed by the speaker in the speaker's gaze direction, and minutes-of-proceedings generating means for associating information indicating whether the attendant agrees with the statement with information indicating progress-of-proceedings. Moreover, the agreement judgment means may further judge whether the attendant agrees with the speaker's statement by further analyzing behavior of the attendant. Moreover, the conference support system may further include: statement receiving means for receiving the speaker's statement; agreement judgment means for judging whether an attendant, who is gazed by the speaker in the speaker's gaze direction, agrees with the statement by analyzing the image received by the image receiving means when the statement is a question to the attendant; and minutes-of-proceedings generating means for associating information indicating whether the attendant agrees with the statement with information indicating progress-of-proceedings.

According to a second aspect of the present invention, there is provided an information displaying apparatus, including: displaying means for displaying information for a reader; reader's gaze direction detection means for detecting gaze direction of the reader who reads the information displayed on the displaying means; reading part detection means for detecting a part being read by the reader among the information displayed on the displaying means based on the gaze direction; and recording means for recording the part being read detected by the reading part detection means. Moreover, the recording means may record bookmark information indicating the part being read at a time of the reader stopping reading when the reader stops reading; and the displaying means may sequentially display the information for the reader from the part indicated by the bookmark information when the reader resumes reading.

Moreover, the information displayed by the displaying means may be a hypertext which contains a hyperlink in one page indicating storage position of another page, and the displaying means may display the other page indicated by the hyperlink when an object gazed by the reader in reader's gaze direction is the hyperlink. Moreover, according to a third aspect of the present invention, there is provided an article including a storage medium having a plurality of machine readable instructions for controlling a conference support system for supporting progress of proceedings, wherein when the instructions are executed, the instructions causes a machine to function as: speaker's gaze direction detection means for detecting a gaze direction of a speaker of a conference; image receiving means for receiving an image in which object gazed by the speaker in speaker's gaze direction is photographed; and displaying means for displaying the image received by the image receiving means on a display provided for each attendant of the conference.

According to a fourth aspect of the present invention, there is provided a method for controlling a conference support system for supporting progress of proceedings. The method includes steps of: detecting a gaze direction of a speaker of a conference; receiving an image in which object gazed by the speaker in speaker's gaze direction is photographed; and displaying the image received is the image receiving step on a display provided for each attendant of the conference. The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

EXAMPLE 1

The invention will now be described based on the preferred embodiments, which do not intend to limit the scope of the present invention, but exemplify the invention. All of the features and the combinations thereof described in the embodiment are not necessarily essential to the invention.

Figure 1:
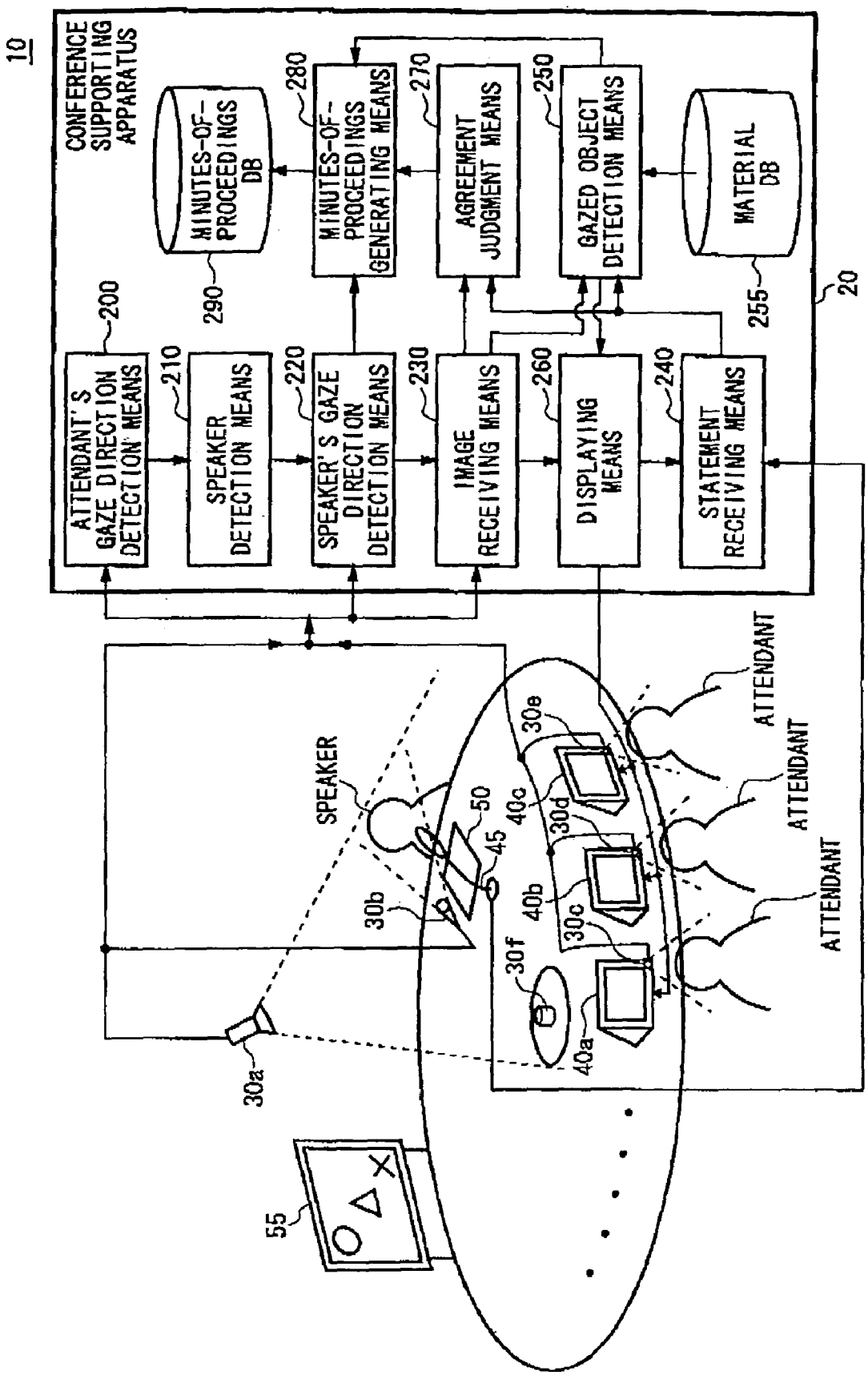
FIG. 1 is a schematic view exemplary illustrating a conference support system 10.

FIG. 1 is a schematic view exemplary illustrating a conference support system 10. The conference support system 10 includes a conference support apparatus 20, a plurality of photographing apparatuses 30a-f to take photographs of a conference room, a plurality of displaying apparatuses 40a-c provided for each attendant of the conference, a microphone 45 which collects speaker's voices, a material 50, and a felt board 55. The conference support system 10 detects a speaker at the conference based on the images photographed by the photographing apparatuses 30a-f, displays the object gazed by the speaker on the displaying apparatuses 40a-c, and records them as minutes-of-proceedings. This allows the attendants to understand the details of the conference, and helps the smooth progress of the proceedings.

The conference supporting apparatus 20 includes attendant's gaze direction detection means 200, speaker detection means 210, speaker's gaze direction detection means, image receiving means 230, statement receiving means 240, gazed object detection means 250, a material data base 255, displaying means 260, agreement judgment means 270, minutes-of-proceedings generating means 280, and a minutes-of-proceedings data base 290, The attendant's gaze direction detection means 200 detects a gaze direction of at least one attendant of the conference based on the images photographed by the photographing apparatuses 30a-f, and sends them to the speaker detection means 210. Based on the gaze direction of the attendants, the speaker detection means 210 detects a speaker out of the attendants of the conference, and send the detected result to the speaker's gaze direction detection means 220. In FIG. 1, although the speaker detected by the speaker detection means 210 is illustrated as "speaker" and each of the attendants except the speaker is illustrated as "attendant", the speaker is not predetermined but is detected by the speaker detection means 210.

The speaker's gaze direction detection means 220 selects the photographing apparatus 30a and 30b to photograph the speaker based on the detection result of the speaker received from the speaker detection means 210. Then, the speaker's gaze direction detection means 220 receives the photographed image of the speaker from the photographing apparatus 30a and 30b. Based on the received image, the speaker's gaze direction detection means 220 detects the gaze direction of the speaker, and sends the detected result to the image receiving means 230. Moreover, the speaker's gaze direction detection means 220 sends the photographed image of the speaker to the minutes-of-proceedings generating means 280.

The image receiving means 230 receives a gazed object image, which is a photographed image of the object gazed by the speaker in the speaker's gaze direction, from at least one of the photographing apparatuses 30a-f, and sends to the gazed object detection means 250, the displaying means 260, and the agreement judgment means 270. For example, when the speaker gazes the material 50, the image receiving means 230 receive the image of the material 50 from the photographing apparatus 30a. On the other hand, when the speaker's gaze direction is not the material 50 but one of the attendants, the image receiving means 230 may receive the photographed image of the attendant photographed by the photographing apparatus 30f, which is a 360-degree camera, for example.

The statement receiving means 240 receives a statement of the speaker from the microphone 45, and sends it to the gazed object detection means 250. The gazed object detection means 250 receives the gazed object image of the photographed object gazed by the speaker in the speaker's gaze direction from the image receiving means 230, and receive the speaker's statement from the statement receiving means 240. By analyzing the gazed object image, the gazed object detection means 250 detects object identification information for identifying the object gazed in the speaker's gaze direction, and sends it to the displaying means 260 and the minutes-of-proceedings generating means 280.

For example, when the speaker gazes the material 50, the gazed object detection means 250 detects material identification information which identifies the material 50 gazed by the speaker in the speaker's gaze direction and material reference part information indicating a part gazed by the speaker in the material 50 as the object identification information. Moreover, when the speaker gazes the feltboard 55, the gazed object detection means 250 may detect that the object identification information of the speaker is the feltboard.

As an example of the processing, the gazed object detection means 250 may detect the material identification information and the material reference part information by searching the text data in the material 50 with words in the statement received from the statement receiving means 240. Moreover, the gazed object detection means 250 may detect the page number and the line number of the record gazed by the speaker as material reference part information by analyzing the page number and the line number of the material 50 gazed by the speaker. Moreover, when the material data base 255 stores the material 50 in advance, the gazed object detection means 250 may detect the material identification information of the material gazed by the speaker by analyzing arrangement of a header, a title, and a text and a drawing of the material 50, and comparing them with the material received from the material data base 255.

The displaying means 260 displays the image received by the image receiving means 230, the material identification information received from the gazed object detection means 250, and the material reference part information received from the gazed object detection means 250 on each of displaying apparatuses 40*a-c*. When the statement received from the statement receiving means 240 indicates that the speaker is questioning to one of the attendants by analyzing the image received by the image receiving means 230, the agreement judgment means 270 judges the agreement status indicating whether the attendant has agreed with the statement, and send the judgment result to the minutes-of-proceedings generating means 280.

Figure 2:
FIG. 2 is a schematic view exemplary illustrating minutes-of-proceedings stored on a minutes-of-proceedings data base 290 by minutes-of-proceedings generating means 280.
Figure 2:
Figure 2:

FIG. 2 is a schematic view exemplary illustrating minutes-of-proceedings stored on the minutes-of-proceedings data base 290 by minutes-of-proceedings generating means 280. At a given time of the conference, the minutes-of-proceedings generating means 280 stores the photographed image of the speaker at the time, the object identification information identifying the object gazed by the speaker, and the agreement status indicating whether the attendant has agreed with the statement of the speaker.

Specifically, the minutes-of-proceedings generating means 280 store the purport of what Mr. XX, who is the speaker, said with reference to the lines 3-5, page 10 of the "Material for Agenda A" from 3:10 pm to 3:30 pm. Then, the minutes-of-proceeding generating means 280 further stores the purport that the attendants agreed with the Mr. XX's statement.

In addition to the example with reference to FIG. 2, the minutes-of-proceedings generating means 280 may associate the progress-of-proceedings with the speaker's statement received by the statement receiving means 240, and may store them further, Moreover, the information indicating the progress-of-proceedings is not limited to the time or the time zone, but it may be information indicating the schedule of the progress-of-proceedings which was input in advance.

Figure 3:
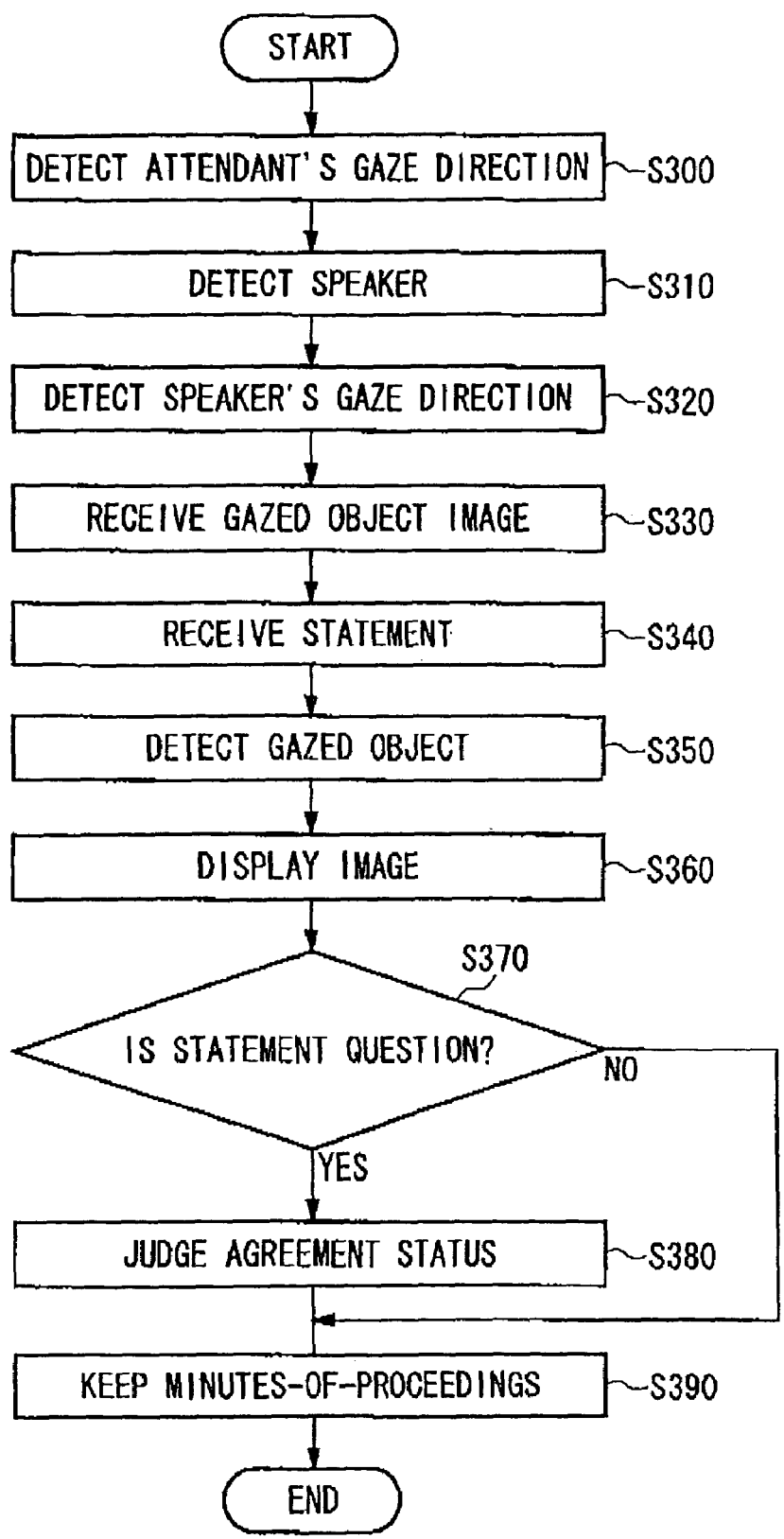
FIG. 3 is a flow chart exemplary illustrating an operation how the conference support system 10 supports progress of proceedings.

FIG. 3 is a flow chart exemplary illustrating an operation how the conference support system 10 supports the progress of the proceedings. The attendant's gaze direction detection means 200 detects the gaze direction of at least one of the attendants of the conference (S300). As an example, the attendant's gaze direction detection means 200 may detect the gaze direction of the attendant based on the direction of the face of the attendant, the position of an iris of the attendant, etc., in the photographed image.

The speaker detection means 210 detects the speaker out of the attendants of the conference based on the gaze direction of at least one attendant (S310). For example, the speaker detection means 210 may detect the position of the speaker among the attendants where the gaze directions of two attendants intersect. Moreover, the speaker detection means 210 may detect the speaker when the speaker is gazed by more than a predetermined number of attendants. In the case that the speaker is gazed by less than a predetermined number of attendants, the speaker detection means 210 may detect that there is no speaker.

The speaker's gaze direction detection means 220 receives the photographed image of the speaker from the photographing apparatuses which photograph the speaker, for example, the photographing apparatuses 30*a* and 30*b*, based on the detection result about the speaker received from the speaker detection means 210. Then, the speaker's gaze direction detection means 220 detects the gaze direction of the speaker based on the received image (S320). Specifically, the speaker's gaze direction detection means 220 may detect the speaker's gaze direction based on the direction of the face of the speaker, the position of an iris of the speaker, etc., in the photographed image as well as the case where the gaze direction of the attendant is to be detected.

The image receiving means 230 receives the gazed object image, which is a photographed image of the object gazed by the speaker in the speaker's gaze direction, from the photographing apparatuses 30*a-f*, or the like (S330). The statement receiving means 240 receives the speaker's statement by analyzing the speaker's voice with voice recognition (S340).

The gazed object detection means 250 detects the object identification information identifying the object gazed by the speaker in the speaker's gaze direction by analyzing the gazed object image (S350). The displaying means 260 displays the image received by the image receiving means 230 and the object identification information detected by the gazed object detection means 250 on each of displaying apparatuses 40*a*-40*c* provided for each of the attendants of the conference (S360).

The agreement status indicating whether an attendant, who is gazed by the speaker, agreed with the statement is judged by the agreement judgment means 270 when the speaker's statement received by the statement receiving means 240 is a question from the speaker to the attendant (S370: YES) by analyzing the image received by the image receiving means 230 (S380).

For example, the agreement judgment means 270 may judge whether the attendant agrees with the statement by analyzing facial expression of the attendant gazed by the speaker. For example, average person's facial expression changes variously according to the person's feeling or the like. Moreover, it is known that there is regularity in change of facial expression when people get angry or smile. Specifically, it is known that positional relationship between corner and center of one's mouth, proportion of the area in which a dental portion appears to the whole face, position of the upper and lower sides of eyebrows, and distance between eyebrows changes regularly according to one's emotion.

At first, the agreement judgment means 270 judges the emotion of the attendant based on the regularity of the facial expression change according to people's emotion. Then, when the emotion is joy and/or pleasure, the agreement judgment means 270 judges that the attendant agrees with the statement. On the contrary, when the emotion is resentment and/or sadness, it judges that the attendant disagrees with the statement.

Preferably, the agreement judgment means 270 photographs facial expression of each attendant before the conference for a long period of time (for example, for one day), to judge the average facial expression of the attendant in order to improve the judgment accuracy of the emotional change. In this case, the agreement judgment means 270 judges the emotion of the attendant based on the facial expression change with respect to the average facial expression of the attendant. As thus described, it is desirable to change a judgment criterion of the facial expression individually, such as deviation of the facial expression of the attendant.

Moreover, according to another example, the agreement judgment means 270 may store images of the facial expression or characteristic difference of the facial expression change when the attendant agrees with the opinion for every attendant of the conference, and also store image of the facial expression or the characteristic difference of the facial expression change when the attendant disagrees with the opinion, as a data base. Then, the agreement judgment means 270 judges the emotion of the attendant by comparing the present facial expression of the attendant with the facial expressions of agreeing case and disagreeing case stored on the data base, or by comparing the characteristic difference of the present facial expression of the attendant with the characteristic differences of agreeing case and disagreeing case stored on the data base, to decide which case resembles the present facial expression more closely than the other case.

Moreover, the agreement judgment means 270 may judge that the attendant agrees with the statement when the attendant exhibits a certain behavior such as nod. More specifically, when the measured vector of the longitudinal direction indicating the movement of the neck of the attendant is larger than the lateral vector, the agreement judgment means 270 may judge that the attendant agrees with the statement. Alternatively, when a predetermined bowing action of the attendant's head is identified, the agreement judgment means 270 may judge that the attendant agrees with the statement. Moreover, when the speaker is asking for show of hands in agreement to the attendants, the agreement judgment means 270 may judge that the attendant agrees with the statement if the attendant raises his/her hand. Then, the minutes-of-proceeding generating means 280 associates the agreement status information, material identification information, and material reference part information with the information indicating the progress-of-proceedings, and store them in the minutes-of-proceedings data base 290 as the minutes of proceedings of the conference (S390).

As mentioned above, as the present example shows, by analyzing the photographed image of the speaker, the conference support system 10 detects the speaker's gaze direction and recognizes the object gazed by the speaker. Then, the conference support system 10 displays the object gazed by the speaker to other attendants and records it on the minutes of proceedings. Thereby, without operation and/or setting of the photographing apparatus, the attendants of the conference can see the material referred by the speaker, and can understand it exactly. Furthermore, even when it is difficult to keep the minutes of proceedings manually, e.g., even when the conference lingers over extended periods of time, or even when there are a lot of attendants of the conference, or even when the attendants have never met one another before the conference, the minutes of proceedings may be kept appropriately.

EXAMPLE 2

Figure 4:
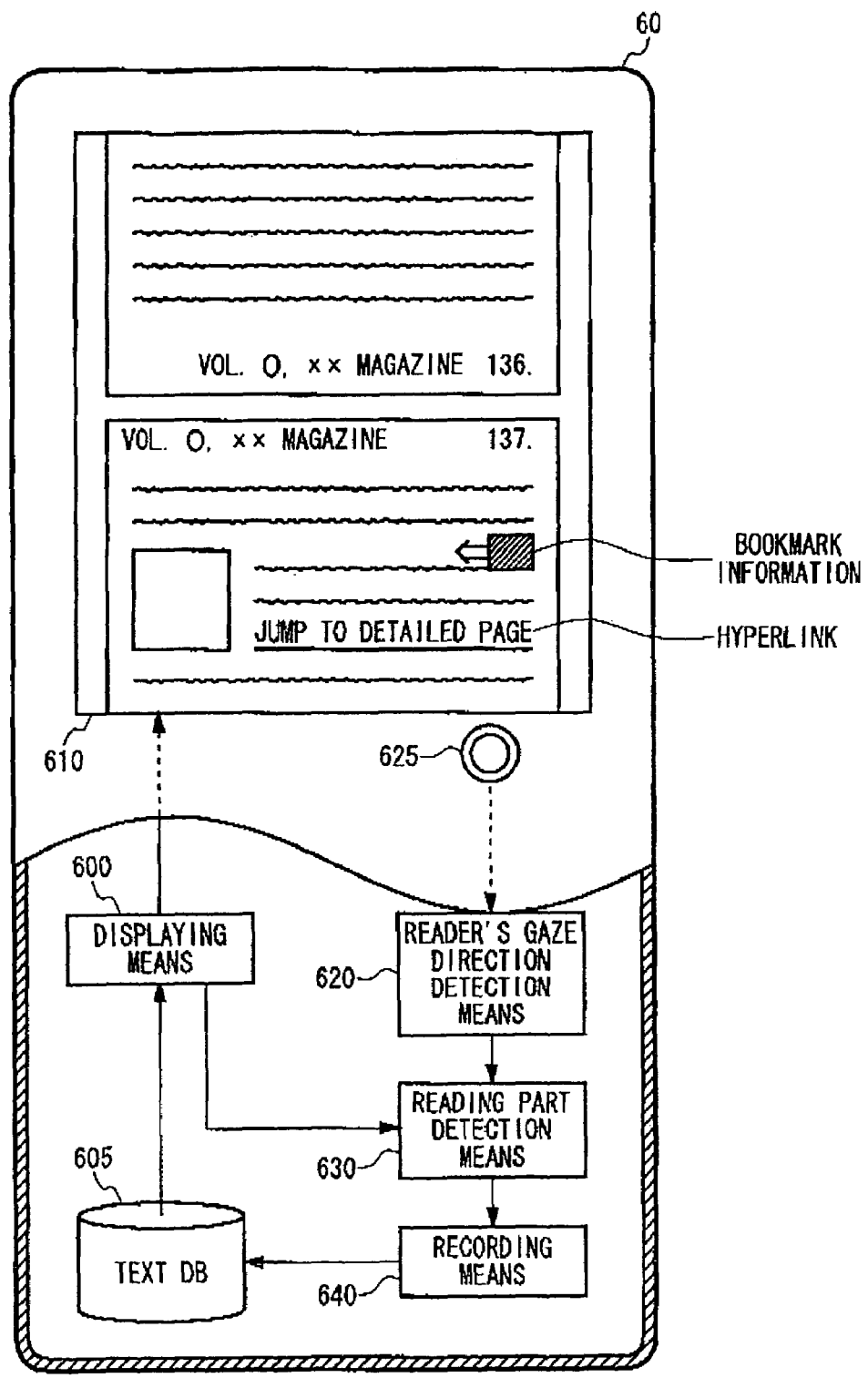
FIG. 4 is a schematic view exemplary illustrating an electronic book 60, which is an example of an information displaying apparatus according to the present invention.

FIG. 4 is a schematic view exemplary illustrating the electronic book 60, which is an example of an information displaying apparatus according to the present invention. The electronic book 60 includes displaying means 600, a text data base 605, a display screen 610, reader's gaze direction detection means 620, a photographing apparatus 625, a reading part detection means 630, and recording means 640. The displaying means 600 receives information from the text data base 605 sequentially, and displays it on the display screen 610. Moreover, the displaying means 600 sends the information indicating the part currently displayed on the display screen 610 among the information received from the text data base 605 to the reading part detection means 630.

For example, the displaying means 600 displays the contents of material, such as a newspaper and a magazine. Then, the displaying means 600 sends a page number, a line number, etc. which are being displayed, of the material to the recording means 640 as information indicating the part being displayed currently. According to an example illustrated in FIG. 4, the displaying means 600 is displaying pages 136-137 of vol. O of "XX Magazine", and sends the information of the displayed part to the reading part detection means 630.

Moreover, the information displayed by the displaying means 600 may be a hypertext which contains a hyperlink in one page indicating a link to another page. For example, the 5th line of Page 137 of the material displayed by the displaying means 600 may be a hyperlink to another page explaining the detail of the contents of Page 137.

The reader's gaze direction detection means 620 detects the gaze direction of the reader who reads the information displayed on the display screen 610 based on the image photographed by the photographing apparatus 625, and sends the detection result to the reading part detection means 630. The reading part detection means 630 detects a part being read by the reader among the information displayed by the displaying means 600, and sends the detection result to the recording means 640. For example, when the reader's gaze direction is in the upper half of the display screen 610 and when the displaying means 600 indicates page 136 of vol. O of "XX magazine" on the upper half of the display screen 610, the reading part detection means 630 detects page 136 of vol. O of "XX magazine" as the part being read by the reader.

The recording means 640 records the part being read, which is detected by the reading part detection means 630, on the text data base 605. For example, when the reader stops reading, the recording means 640 may record the reading part detected by the reading part detection means 630 as bookmark information indicating the reading part at the time of stopping reading. In this case, the displaying means 600 may display the bookmark information stored on the text data base 605.

Figure 5:
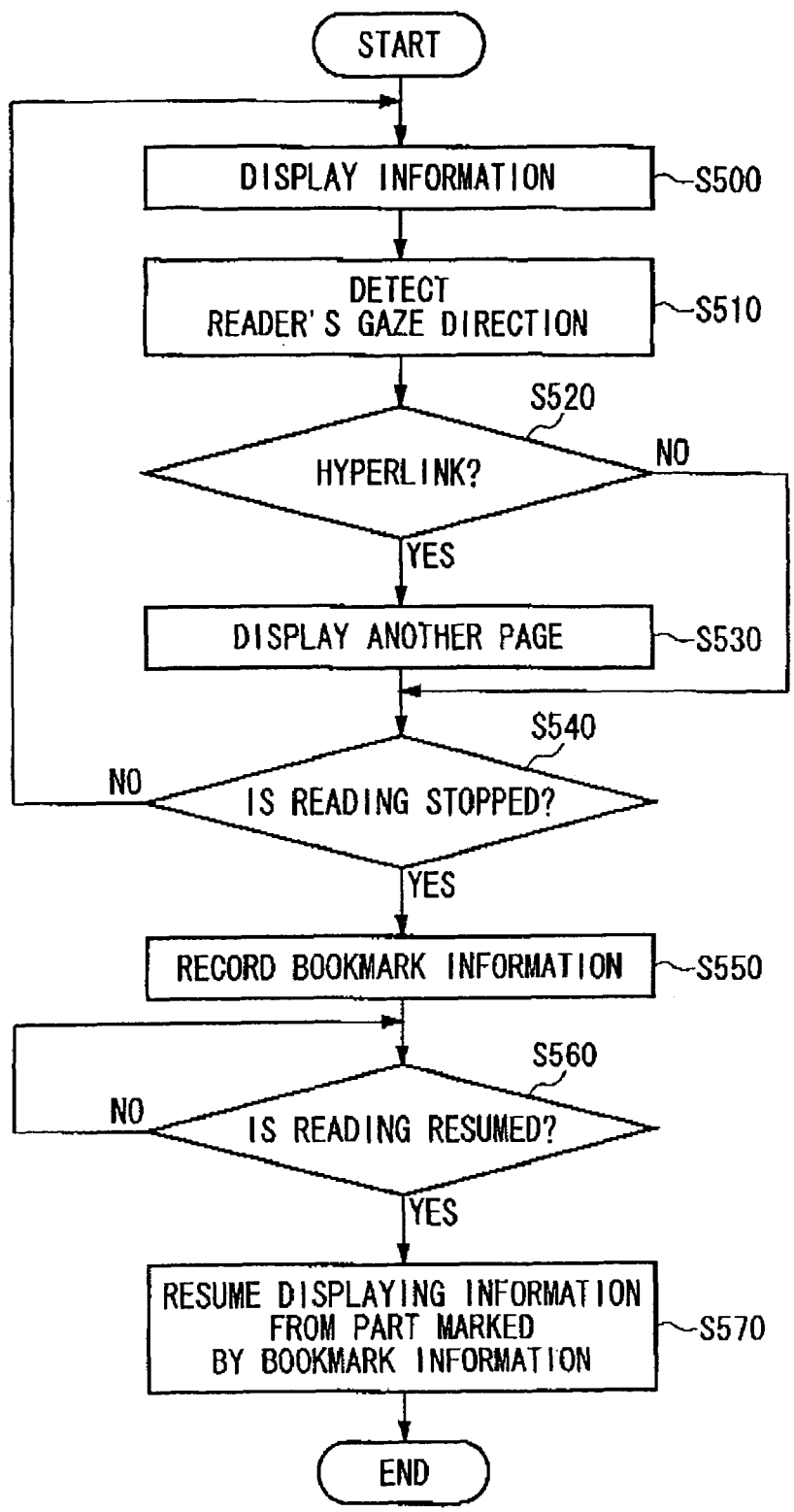
FIG. 5 is a flow chart exemplary illustrating an operation of the electronic book 60.

FIG. 5 is a flow chart exemplary illustrating an operation of the electronic book 60. The displaying means 600 receives text data from the text data base 605 sequentially, and displays them on the display screen 610 (S500). The reader's gaze direction detection means 620 detects the gaze direction of the reader who reads the information displayed on the display screen 610 (S510). When the object, which is gazed by the reader in the reader's gaze direction, is a hyperlink (S520: YES), the displaying means 600 displays another page linked by the hyperlink (S530). More specifically, the reader's gaze direction detection means 620 may display another page linked by the hyperlink when the reader gazes the hyperlink for a predetermined period of time or when the hyperlink gazed more than a predetermined number of times within a predetermined period of time.

When the reader does not stop reading (S540: NO), the process executed by the electronic book 60 returns to S500 and displays the information sequentially. On the other hand, when the reader stops reading (S540: YES), the recording means 640 records the bookmark information indicating the reading part at the time of stopping reading (S550).

For example, the electronic book 60 judges whether the reader stopped reading by judging whether the power is switched on. Alternatively, when the material being read is changed to another material, the electronic book 60 may judge that the material which had been displayed before the change was stopped. Then, when the reader resumes the reading the information (S560: YES), the displaying means 600 resumes displaying the information sequentially from the part marked by the bookmark information (S570).

Thus, according to this example, the electronic book 60 can detect appropriately the part being read by the reader among the information currently displayed without complicated operation by the user. Thereby, the user can operate the electronic book 60 only by gazing the material without complicated operation such as pressing a switch or a button etc. For example, a hyperlink can be traced so that another page may be displayed, or half-read information may be bookmarked.

Figure 6:
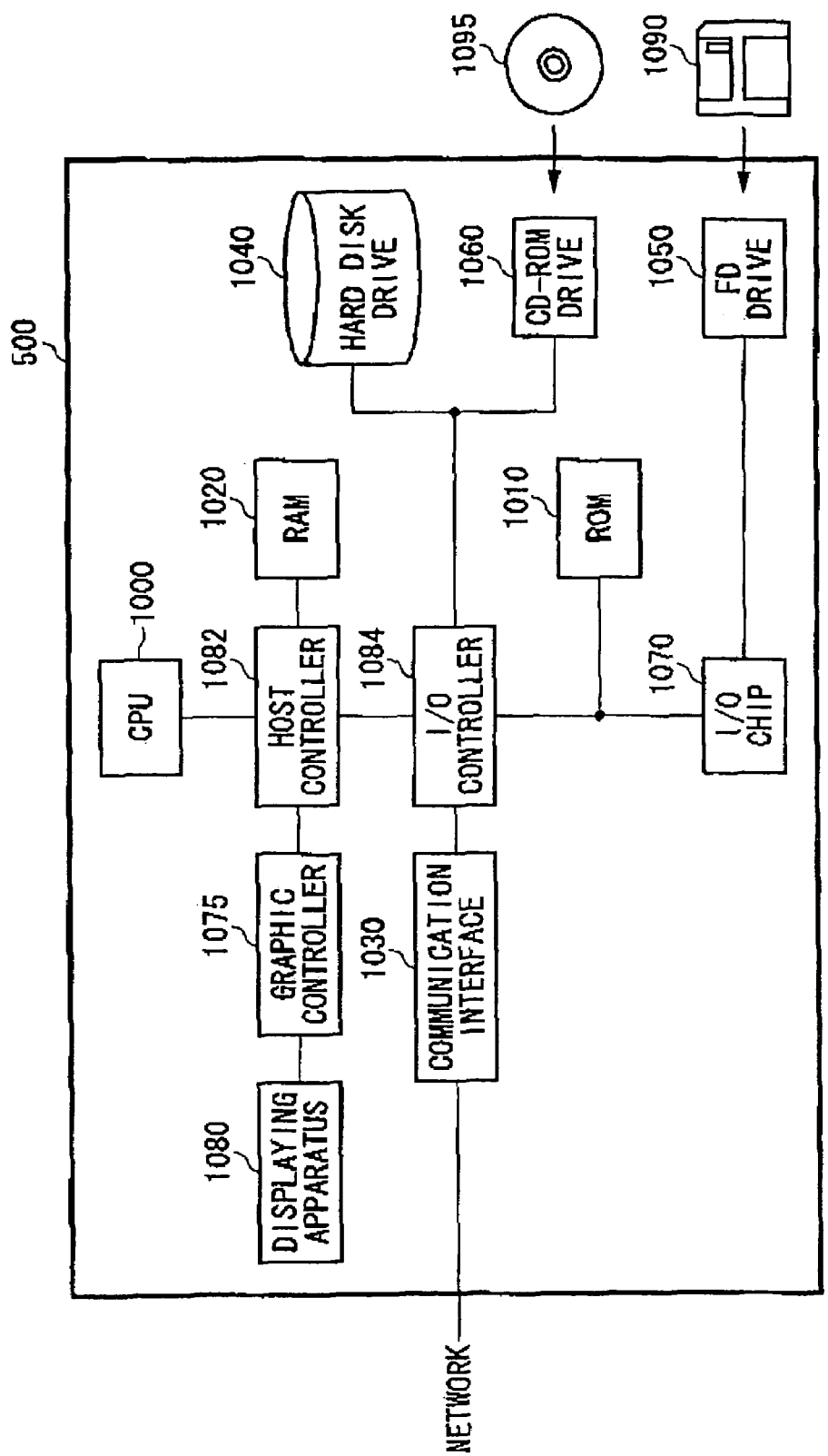
FIG. 6 is a hardware block diagram of a computer 500 which acts as a conference support apparatus 20 or the electronic book 60.

FIG. 6 is a hardware block diagram of a computer 500 which acts as a conference support apparatus 20 or the electronic book 60. The computer 500 includes: a CPU periphery having CPU 1000, RAM 1020, a graphic controller 1075, and a displaying apparatus 1080 which are mutually connected by a host controller 1082; an input/output section having a communication interface 1030 connecting with the host controller 1082 by an input/output controller 1084, a hard disk drive 1040, and a CD-ROM drive 1060; and a legacy input/output section having ROM 1010, a flexible disk drive 1050, an input/output chip 1070, which connects with the input/output controller 1084.

The host controller 1082 connects the RAM 1020 with the CPU 1000 and the graphic controller 1075, which access the RAM 1020 at a high transmission rate. The CPU 1000 operates based on the program stored on the ROM 1010 and the RAM 1020 and controls each part. The graphic controller 1075 receives the image data on the frame buffer in the RAM 1020 allocated by the CPU 1000 or the like, and displays it on the displaying apparatus 1080. Alternatively, the graphic controller 1075 may further include a frame buffer therein to store the image data generated by the CPU 1000 or the like.

The input/output controller 1084 connects the host controller 1082 with the communication interface 1030, which is a comparatively high-speed input/output device, the hard disk drive 1040, and the CD-ROM drive 1060. The communication interface 1030 communicates with an external apparatus through networks, such as a fiber channel. The hard disk drive 1040 stores the program and data used by the computer 500. The CD-ROM drive 1060 reads a program or data on the CD-ROM 1095, and provides them to the input/output chip 1070 through the RAM 1020.

Moreover, the ROM 1010 and the comparatively low speed input/output device, such as the flexible disk drive 1050, the input/output chip 1070 and/or the like, connect with the input/output controller 1084. The ROM 1010 stores the boot program executed by the CPU 1000 during start-up of the computer 500, a program depending on the hardware of the computer 500, and the like. The flexible disk drive 1050 reads the program or data on the flexible disk 1090, and provides them to the input/output chip 1070 through the RAM 1020. The input/output chip 1070 connects with the flexible disk 1090, and with various kinds of input/output devices through a parallel port, a serial port, a keyboard port, a mouse port, etc.

The program provided to the computer 500 is stored on a record medium, such as the flexible disk 1090, a CD-ROM 1095, or an IC card, which is provided by a user. The program is read from the record medium and installed in the computer 500 through the input/output chip 1070 and/or the input/output controller 1084, and then it is executed.

The program installed in the computer 500 and executed to cause the computer 500 to act as the conference supporting apparatus 20 includes an attendant's gaze direction detection module, a speaker detection module, a speaker's gaze direction detection module, an image receiving module, a statement receiving module, a gazed object detection module, a display module, an agreement judgment module, and a minutes-of-proceedings generating module. Moreover, the program which causes the computer 500 to act as the electronic book 60 includes a display module, a reader's gaze direction detection module, the reading part detection module, and a record module.

Moreover, the program may use the hard disk drive 1040 as the material data base 255, the minutes-of-proceedings data base 290, or the text data base 605. Since the function of the modules, by which the computer 500 is manipulated, is the same as the operation of the corresponding component of the conference supporting apparatus 20 or the electronic book 60 illustrated in FIGS. 1-5, explanation of the function of the modules will be omitted.

As the recording medium for storing the program or the modules, an optical recording medium such as a DVD and a PD, a magneto-optical recording medium such as an MD, a tape-like medium, a magnetic recording medium, a semiconductor memory such as an IC card and a miniature card, and the like, can be used other than the flexible disk 1090, and the CD-ROM 1095. Moreover, a storage device such as a hard disk or RAM provided in a server system connected to an exclusive communication network or the Internet may be used as the recording medium, and the program can be provided to the computer 500 via the network.

According to the present invention, the progress of the proceedings is supported by making the contents of the conference understand easily to the attendant of the conference.

Although the present invention has been described by way of exemplary embodiments, it should be understood that those skilled in the art might make many changes and substitutions without departing from the spirit and the scope of the present invention which is defined only by the appended claims.

What is claimed is:

1. A conference support system for supporting progress of proceedings, comprising:
   speaker's gaze direction detection means for detecting a gaze direction of a speaker of a conference;
   detecting means for detecting a reaction in response to a statement of the speaker and outputting a signal representing the reaction wherein said detecting means comprises a statement receiving means for receiving the speaker's statement;

storing means for storing the signal representing the reaction detected by said detecting means;

image receiving means for receiving an image in which object gazed by the speaker in speaker's gaze direction is photographed;

displaying means for displaying the image received by said image receiving means on a display provided for each attendant of the conference; and a response judgment means for judging a response of an attendant, who is gazed by the speaker in the speaker's gaze direction, by analyzing the image received by said image receiving means only when the statement is a certain type.

2. The conference support system as claimed in claim 1, further comprising minutes-of-proceedings generating means for associating object identification information identifying the object gazed by the speaker in the speaker's gaze direction with information indicating progress-of-proceedings and for recording them.

3. The conference support system as claimed in claim 1, further comprising gazed object detection means for detecting material identification information indicating material gazed by the speaker in the speaker's gaze direction, and material reference part information indicating a part gazed by the speaker among the material by analyzing the photographed image of the object gazed by the speaker in the speaker's gaze direction, and said displaying means displays the material identification information and the material reference part information detected by said gazed object detection means.

4. The conference support system as claimed in claim 3, further comprising statement receiving means for receiving a speaker's statement, wherein said gazed object detection means detects a part gazed by the speaker among the material by searching text data in the material using words included in the statement.

5. The conference support system as claimed in claim 1, further comprising:

attendant's gaze direction detection means for detecting a gaze direction of at least one of attendants attending the conference; and speaker detection means for detecting a speaker out of the attendants of the conference based on the gaze direction of at least one of the attendants.

6. The conference support system as claimed in claim 1, further comprising:

agreement judgment means for judging whether an attendant agrees with the speaker's statement when analyzing the facial expression of the attendant who is gazed by the speaker in the speaker's gaze direction, and minutes-of-proceedings generating means for associating information indicating whether the attendant agrees with the statement with information indicating progress-of-proceedings.

7. The conference support system as claimed in claim 6, wherein said agreement judgment means further judges whether the attendant agrees with the speaker's statement by further analyzing behavior of the attendant.

8. The conference support system as claimed in claim 1, further comprising:

statement receiving means for receiving the speaker's statement;

agreement judgment means for judging whether an attendant, who is gazed by the speaker in the speaker's gaze direction, agrees with the statement by analyzing the image received by said image receiving means when the statement is a question to the attendant; and minutes-of-proceedings generating means for associating information indicating whether the attendant agrees with the statement with information indicating progress-of-proceedings.

9. An information displaying apparatus, comprising:

displaying means for displaying information for a reader;

reader's gaze direction detection means for detecting gaze direction of the reader who reads the information displayed on said displaying means;

reading part detection means for detecting a part being read by the reader among the information displayed on the displaying means based on the gaze direction; and recording means for recording the part being read detected by said reading part detection means, and wherein the information displayed by said displaying means is a hypertext which contains a hyperlink in one page indicating storage position of another page, and said displaying means displays the other page indicated by the hyperlink when an object gazed by the reader in reader's gaze direction is the hyperlink.

10. The information displaying apparatus as claimed in claim 9, wherein said recording means records bookmark information indicating the part being read at a time of the reader stopping reading when the reader stops reading; and said displaying means sequentially displays the information for the reader from the part indicated by the bookmark information when the reader resumes reading.

11. An article comprising a storage medium having a plurality of machine readable instructions for controlling a conference support system for supporting progress of proceedings, wherein when the instructions are executed, the instructions causes a machine to function as:

speaker's gaze direction detection means for detecting a gaze direction of a speaker of a conference;

means for detecting a reaction in response to a statement of the speaker, wherein said means for detecting comprises a statement receiving means for receiving the speaker's statement;

means for storing a signal representative of the reaction;

image receiving means for receiving an image in which object gazed by the speaker in speaker's gaze direction is photographed;

displaying means for displaying the image received by the image receiving means on a display provided for each attendant of the conference; and a response judgment means for judging a response of an attendant, who is gazed by the speaker in the speaker's gaze direction, by analyzing the image received by said image receiving means only when the statement is a certain type.

12. A method for controlling a conference support system for supporting progress of proceedings, comprising steps of:

detecting a gaze direction of a speaker of a conference;

detecting a reaction in response to a statement of the speaker wherein said detecting also comprises receiving the speaker's statement;

storing a signal representative of the reaction;

receiving an image in which object gazed by the speaker in speaker's gaze direction is photographed;

displaying the image received is said image receiving step on a display provided for each attendant of the conference;

judging a response of an attendant, who is gazed by the speaker in the speaker's gaze direction, by analyzing the image received only when the statement is a certain type.

13. A conference support system for supporting progress of proceedings of a conference where there are a speaker and an attendant, comprising
a photographing means provided at the conference site, said photographing apparatus photographing the speaker, the attendant and an object upon which the speaker relies for his presentation;
a conference supporting apparatus comprising:
a first section connecting to said photographing means and receiving image signals therefrom in which at least the speaker is photographed, said first section detecting the speaker's gaze direction; and
a second section connecting to said photographing means and an output of said first section, said second section receiving image signals from said photographing means in which image at least the object gazed by the speaker in the speaker's gaze direction is photographed, said second section further receiving image signals from said photographing means in which at least the attendant is photographed, said second section outputting the particular image signal in accordance with the output signal of said first section; and
a third section connecting to an output of said second section and detecting a reaction in response to a statement of the speaker based on the image signal received from said second section; said third section outputting a signal representing the detected reaction, wherein said third section comprises a statement receiving means for receiving the speaker's statement;
a fourth section connecting to an output of said third section and storing the signal representing reaction detected by said third section;
a displaying unit provided at the conference site and connecting to said second
section of said conference supporting apparatus, said displaying apparatus displaying the
image of the object gazed by the speaker in the speaker's gaze direction to the attendant of the conference; and
a response judgment means for judging a response of an attendant, who is gazed by the speaker in the speaker's gaze direction, by analyzing the image received by said first section only when the statement is a certain type.

14. An information displaying apparatus, comprising:
a displaying unit arranged on the surface of the displaying apparatus;
a photographing unit provided on the displaying apparatus, said photographing unit photographing the reader;
a control section comprising:
a first section connecting to said photographing unit and receiving image signals therefrom in which at least the reader is photographed, said first section detecting the reader's gaze direction of the reader who reads information displayed on said displaying unit;
a second section connecting to said first section and said displaying unit,
said second section receiving output signals of said first section representing the gaze direction of the reader and receiving the information displayed by said displaying unit, said second section detecting a part being read by the reader among the information displayed on the displaying unit based on the gaze direction of the reader; and
a third section connecting to an output of said second section and recording the part of the information being displayed on the displaying unit and read by the reader in accordance with the detection signal of said second section, and
wherein the information displayed by said displaying means is a hypertext which contains a hyperlink in one page indicating storage position of another page, and
said displaying means displays the other page indicated by the hyperlink when an object gazed by the reader in reader's gaze direction is the hyperlink,
detecting means for detecting a response to a statement which comprises a statement receiving means for receiving the speaker's statement; and
a response judgment means for judging a response of an attendant, who is gazed by the speaker in the speaker's gaze direction, by analyzing the image received by said first section only when the statement is a certain type.

* * * * *